(12) United States Patent
Joyce

(10) Patent No.: US 10,232,553 B2
(45) Date of Patent: Mar. 19, 2019

(54) METHOD FOR GENERATING A THREE-DIMENSIONAL (3D) OBJECT

(71) Applicant: B9Creations, LLC, Rapid City, SD (US)

(72) Inventor: Michael Joyce, Deadwood, SD (US)

(73) Assignee: B9CREATIONS, LLC, Rapid City, SD (US)

(*) Notice: Subject to any disclaimer, the term of this patent is extended or adjusted under 35 U.S.C. 154(b) by 1001 days.

(21) Appl. No.: 14/532,645

(22) Filed: Nov. 4, 2014

(65) Prior Publication Data

US 2015/0123320 A1 May 7, 2015

Related U.S. Application Data

(60) Provisional application No. 61/901,197, filed on Nov. 7, 2013.

(51) Int. Cl.
| | |
|---|---|
| *G06F 17/50* | (2006.01) |
| *G06F 19/00* | (2018.01) |
| *B29C 64/386* | (2017.01) |
| *B29C 64/124* | (2017.01) |
| *B29C 64/393* | (2017.01) |
| *B29C 64/135* | (2017.01) |
| *B29C 64/129* | (2017.01) |
| *B33Y 30/00* | (2015.01) |
| *B33Y 10/00* | (2015.01) |

(52) U.S. Cl.
CPC .......... *B29C 64/386* (2017.08); *B29C 64/124* (2017.08); *B29C 64/129* (2017.08); *B29C 64/135* (2017.08); *B29C 64/393* (2017.08); *B33Y 10/00* (2014.12); *B33Y 30/00* (2014.12)

(58) Field of Classification Search
CPC ... B29C 64/124; B29C 64/129; B29C 64/135; B29C 64/386; B29C 64/393; G06F 17/50; G06F 19/00
USPC .......................................... 264/401; 700/120
See application file for complete search history.

(56) References Cited

U.S. PATENT DOCUMENTS

| | | | |
|---|---|---|---|
| 4,575,330 A | * | 3/1986 | Hull .................... B29C 64/124 264/401 X |
| 6,942,830 B2 | | 9/2005 | Mulhaupt |
| 7,052,263 B2 | | 5/2006 | John |
| 7,195,472 B2 | | 3/2007 | John |
| 7,438,846 B2 | | 10/2008 | John |
| 7,636,610 B2 | | 12/2009 | Schillen |
| 7,783,371 B2 | | 8/2010 | John |
| 7,790,093 B2 | | 9/2010 | Shkolnik |

(Continued)

*Primary Examiner* — Leo B Tentoni
(74) *Attorney, Agent, or Firm* — Terry M. Sanks, Esq.; Beusse Wolter Sanks & Maire, PLLC

(57) ABSTRACT

Systems, methods and computer program products are disclosed that facilitate measuring the light output of an additive manufacturing device light source without utilizing additional equipment, such as a light meter. Once the light source output has been measured, such information can be utilized for a variety of purposes, including, but not limited to: (i) delivering a uniform amount of light energy over time to each portion of a layer being formed; (ii) adjusting the intensity of each controllable element (e.g., pixel) of the light source to the measured minimum, thereby creating a uniformly intense light source; and (iii) minimizing the build time of layers or portions of a layer being formed based on the maximum intensity available within a given area of the build area.

18 Claims, 5 Drawing Sheets

(56) References Cited

U.S. PATENT DOCUMENTS

| | | | |
|---|---|---|---|
| 7,831,328 B2 | 11/2010 | Schillen | |
| 7,845,930 B2 | 12/2010 | Shkolnik | |
| 7,892,474 B2 | 2/2011 | Shkolnik | |
| 7,894,921 B2 | 2/2011 | John | |
| 7,962,238 B2 | 6/2011 | Shkolnik | |
| 8,003,040 B2 | 8/2011 | El-Siblani | |
| 8,110,135 B2 | 2/2012 | El-Siblani | |
| 8,126,580 B2 | 2/2012 | El-Siblani | |
| 8,326,024 B2 | 12/2012 | Shkolnik | |
| 8,372,330 B2 | 2/2013 | El-Siblani | |
| 8,394,313 B2 | 3/2013 | El-Siblani | |
| 8,666,142 B2 | 3/2014 | Shkolnik | |
| 2014/0306380 A1* | 10/2014 | El-Siblani | B29C 64/135 264/401 |

* cited by examiner

METHOD FOR GENERATING A THREE-DIMENSIONAL (3D) OBJECT

CROSS REFERENCE TO RELATED APPLICATION

This application claims the benefit of U.S. Provisional Patent Application Ser. No. 61/901,197, filed Nov. 7, 2013, and entitled "Exposure Time-Based Projector Normalization for Additive Manufacturing Devices," the entire contents of which are incorporated herein by reference.

FIELD OF THE DISCLOSURE

The present disclosure generally relates to additive manufacturing devices and more particularly to systems, methods and computer program products for optimizing part creation and minimizing build times.

BACKGROUND

The statements in this section merely provide background information related to the present disclosure and may not constitute prior art.

Additive manufacturing devices produce three-dimensional parts by sequentially adding materials in a pattern. Some classes of additive manufacturing devices produce polymer parts solidified from a photopolymer resin which has been exposed in a layer-wise fashion to electromagnetic radiation generated by a light source such as a projector. The light source projects a cross sectional image into a build area, solidifying a layer of photopolymer resin into a hardened layer, thereby adding another layer to the object being formed. Ideally, energy output from the light source would be precisely controlled and uniform across the build area for a single light source. Furthermore, consistency from light source to light source is desired when producing such additive manufacturing devices in quantity.

Consistent energy output is essential because the photopolymer resin only hardens into a solid form when exposed to sufficient flux of a specific wavelength of light. If an area to be hardened is not exposed to a sufficiently intense burst of light, it will not solidify in a desirable fashion. Additionally, if an area to be hardened is overexposed, the area will over harden, or "overcure," which may hamper the building process by, for example, sticking to the build area surface or hardening more resin than required, thereby creating a deformed or failed build. Overcuring often occurs where a light source "hotspot" exists. A hotspot is an area of high relative light intensity.

In order to create consistent energy output from a light source, previous additive manufacturing devices have been calibrated using costly and specialized equipment. In one process, a light meter is set up above the build area of the additive manufacturing device. The light source displays a test pattern (e.g., full brightness across the build area) and the light meter measures the actual output at various points within the build area, creating a "map" of light output. Absolute maximum and absolute minimum are determined. Where the light source is a pixel-based projector, such as a digital micromirror device-based projector, light output may be measured at each pixel or for discrete groups of pixels. Brightnesses of controllable elements (e.g., pixels) of the light source are adjusted such that uniform light output is achieved. This is often accomplished by dimming all controllable elements of the light source to the measured absolute minimum. Although this method may provide a uniform light source, build times are increased due to reduced energy flux into the photopolymer resin. The full range of energy output is not used.

Over the life of an additive manufacturing device, it is often necessary to recalibrate the light source in order to ensure uniformity. In particular, the light source may comprise a bulb which must be replaced every 400-1,000 hours of operation. When the bulb is replaced, the additive manufacturing device must be recalibrated in order to ensure uniform and predictable light production. Current methods of light source calibration require additional equipment necessitating a costly on-site visit by a calibration technician, renting of the appropriate equipment, or purchase of such equipment.

Given the foregoing, what is needed are systems, methods, and computer program products which facilitate uniform light production by additive manufacturing light sources without utilizing additional equipment. Furthermore, calibration methods which are easily implemented by the user are needed.

Additionally, what is needed are systems, methods, and computer program products which dynamically use a broader range of energy outputs from an additive manufacturing device light source.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure provide devices, systems, methods, and computer program products wherein the energy output of an additive manufacturing device light source is measured without utilizing additional equipment, such as a light meter. Once the light source output has been measured, such information can be utilized for a variety of purposes including, but not limited to: (i) delivering a uniform amount of light energy over time to each portion of a layer being formed; (ii) adjusting the intensity of each controllable element (e.g., pixel) of the light source to the measured minimum, thereby creating a uniformly intense light source; and (iii) minimizing the build time of layers or portions of a layer being formed based on the maximum intensity available within a given area of the build area.

In an aspect, a calibration object is produced by an additive manufacturing device comprising a projector-based light source. The calibration object comprises a plurality of test structures chosen to evaluate the performance of the device. Specifically, each test structure is a multi-layer pyramid comprising square layers. The top layer has sides of 10-250 microns, thereby evaluating high resolution performance. The tests structures are arranged in a grid such that the formation of each of the test structures corresponds with a build area sector. The design of the test structures (e.g., the wall thickness, dimensions, shape, number of tiers, and the like) is chosen such that construction of a given test structure at specified printing parameters (e.g., exposing each layer for ten seconds at 90% brightness) will fail if the light output to the sector of the build area corresponding with the test structure deviates from a desired range. For example, if an upper tier of a tiered test structure fails, that indicates that there is sufficient light output to produce low resolution layers in that sector, but insufficient light output in that sector to produce higher resolution layers at the specified printing parameters. Such information can be used to determine the light output of the light source at each sector of the build area. Production of a calibration object may be repeated using other sets of printing parameters (e.g., exposing each layer for eight seconds at 100% brightness, exposing each layer for twelve seconds at 90% brightness, exposing each layer for ten seconds with brightness varying per sector) in order to confirm the measured light outputs, evaluate other light output ranges, and other reasons apparent to those skilled in the relevant art(s) after reading the description herein.

After the additive manufacturing device produces the calibration object, a user may inspect the calibration object. If the build failed to produce all or part of a given test structure, the information may be provided to an additive manufacturing device control software. Information may be provided by indicating a grid row and column location of the failed test structure. Information may also include the nature of the failure. For example, where the test structure is a tiered pyramid and the uppermost tier failed to be constructed, a user may specify that the upper tier failed. This information is received by the software and, given other controls (e.g., type of photopolymer used, commanded brightness level, exposure time), indicates the actual light output at the corresponding sector. Similarly, successful production of test structures corresponding with other sectors indicates the actual light output of such sectors.

Upon determining the actual light output of the sectors of the build area, a variety of operations may be carried out which optimize part production. For example, a flux compensation factor may be generated for each sector which, when applied, causes the light source to produce a uniform light output flux. A temporal compensation factor may also be generated for each sector which, when applied, causes the light source to generate a uniform amount of energy at each sector for a given amount of time. The build exposure time for each layer of a part being created may be dynamically minimized based on overlap between build area sections and the part layer cross section. That is, if a part layer cross section only overlaps areas that produce high light output, that layer may be exposed at a high brightness for a shorter amount of time compared to a layer that overlaps both high light output and low light output areas.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to systems, methods, and computer program products wherein the energy output of an additive manufacturing device light source is measured without utilizing additional equipment, such as a light meter.

Aspects of the present disclosure provide systems, methods, and computer program products wherein the energy output of an additive manufacturing device light source is measured without utilizing additional equipment, such as a light meter. Once the light source output has been measured, such information can be utilized for a variety of purposes.

Figure 1:
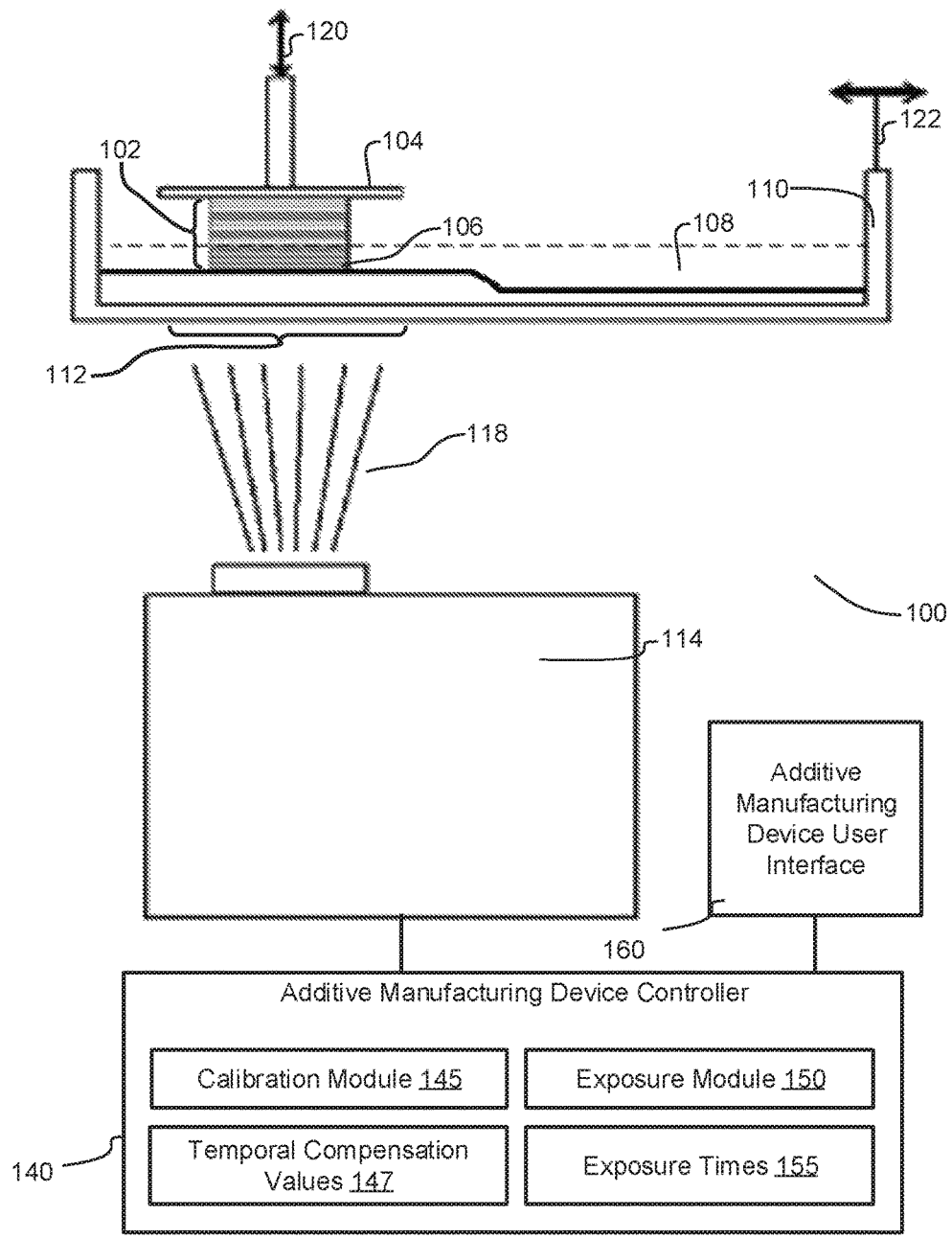
FIG. 1 is a schematic side view of an additive manufacturing device, according to an aspect of the present disclosure.
Figure 2:
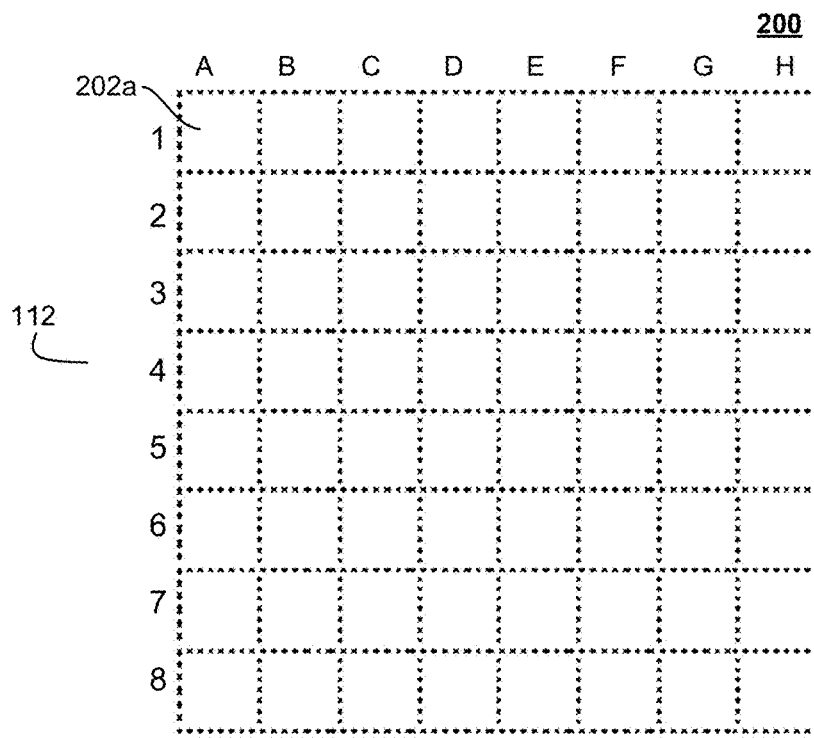
FIG. 2 is a diagram of a build area of an additive manufacturing device depicting an ideal, uniform light output, according to an aspect of the present disclosure.

Referring now to FIG. 1, a schematic side view of an additive manufacturing device 100, according to an aspect of the present disclosure, is shown. The device 100 comprises a light source 114 comprising at least one controllable light source element. The device 100 comprises a build area 112 positioned adjacent to a solidifiable material. Radiation from the light source 114 causes solidifying of portions of the solidifiable material adjacent to the build area 112. The build area 112 comprises a plurality of build area sectors (FIG. 2). The device 100 comprises an additive manufacturing device controller 140 connected to the light source 114. The controller 140 comprising a calibration module 145 configured to receive, via an additive manufacturing device user interface 160 presented to a user, calibration object results, the calibration object results indicating test structure integrity for a plurality of test structures corresponding to the plurality of build area sectors. The calibration module 145 further configured to create a plurality of temporal compensation values 147, each of the temporal compensation values 147 corresponding to one of the plurality of build area sectors (FIG. 2) and chosen to, at a constant brightness, solidify at least a portion of the test structure from the solidifiable material. The additive manufacturing device controller 140 includes an exposure module 150 configured to determine, for each portion of the three-dimensional object created, an exposure time 155 based on the corresponding created temporal compensation value 147 and the part creation instructions, further configured to operate the light source 114 according to the determined exposure times 155. The created plurality of temporal compensation values 147 are stored within the additive manufacturing device controller 140.

Additive manufacturing device 100 constructs a part 102 by curing photopolymer resin 108 or a similar solidifiable material via exposure to an energy flux in the form of electromagnetic radiation 118 from a light source 114. Light source 114 projects light 118 or another curing energy into a build area 112 in a pattern which causes a photopolymer layer 106 to harden into a new portion of part 102, thereby constructing part 102 in a layer-wise fashion. During construction, part 102 is attached to build table 104. Build table 104 is configured to support part 102 as part 102 is being constructed. Build table 104 may comprise a planar, movable surface attached to a z-axis actuator 120. Z-axis actuator 120 is configured to raise part 102 in a step-wise fashion during construction such that additional layers may be added to part 102. In other aspects, light source 114 is not a traditional light source (e.g., it may be a directable source of radiation, electrons, or other energetic particles). Light source 114 may be a laser-based source, a DMD device, a DLP projector, or another device apparent to those skilled in the relevant art(s) after reading the description herein.

Additive manufacturing device 100 may comprise basin 110 and y-axis actuator 122. Basin 110 is configured to house resin 108. Build area 112 may comprise a portion of basin 110. In an aspect, a bottom portion of basin 110 corresponding with build area 112 is transparent.

Y-axis actuator 122 is configured to alter the position of basin 110, thereby facilitating release of a newly-formed part layer from basin 110 and build area 112 via a horizontal sliding motion.

As will be apparent to those skilled in the relevant art(s) after reading the description herein, systems, methods, and computer program products in accordance with the present disclosure may be used with other types of additive manufacturing devices apart from device 100 detailed in FIG. 1.

Referring now to FIG. 2, a diagram 200 of build area 112 depicting an ideal, uniform light output, according to an aspect of the present disclosure, is shown.

Figure 3:
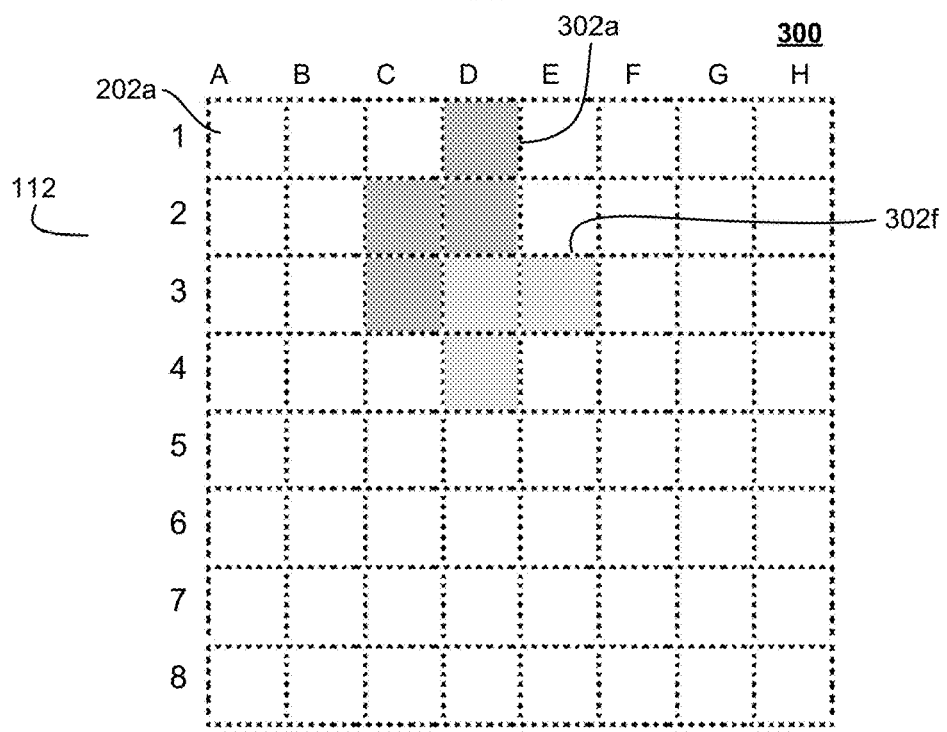
FIG. 3 is a diagram of a build area of an additive manufacturing device depicting an exemplary actual light output, according to an aspect of the present disclosure.

In FIGS. 2 and 3, a grid is shown in dashed lines for reference, indicating build area 112.

In an aspect, build area 112 is an area where light source 114 is capable of projecting light 118 in order to cure photopolymer layer 106 and construct part 102. Light source 114 may control the light output to areas of build area 112 corresponding with individual pixels or other controllable elements of light source 114. The at least one controllable element being a plurality of controllable elements, wherein each of the plurality of build area sectors corresponds to a subset of the plurality of controllable elements.

Diagram 200 divides build area 112 into an 8-by-8 grid of sectors 202 (labeled, for clarity, only as sector 202a in FIG. 2). Aspects of the present disclosure measure the light output of each sector 202. Sector 202 may correspond to one controllable element (e.g., a pixel) or sector 202 may correspond to a plurality of controllable elements of light source (e.g., a 64px×64px region).

All sectors 202 in FIG. 2 are white and uniform, indicating uniform light output.

Referring now to FIG. 3, a diagram 300 of build area 112 of additive manufacturing device 100 depicting an exemplary actual light output, according to an aspect of the present disclosure, is shown.

For an ideal light source 114, light output for each sector 202 would be uniform. This is generally not the case for real world light sources 112. Rather, light output varies across build area 112. Light output may vary as a function of a Gaussian distribution. That is, light output at the center of build area 112 (i.e., D4, D5, E4 and E5) will be greater than light output along the edges of build area 112 (i.e., columns A and H and rows 1 and 8). In another aspect, imperfections in light source 114, focusing optics, or other portions of additive manufacturing device 100 cause the light output at build area 112 to be non-uniform. As shown in FIG. 3, white sectors 202 are receiving an equal light output. Low output sectors 302 (labeled, for clarity, only as low output sectors 302a and 302f in FIG. 3) receive varying, lower amounts of light from light source 112, as shown. Where each sector 202 is exposed for an equal amount of time, portions of layer 106 being cured above low output sectors 302 will not receive the intended light output necessary to cure completely, thereby jeopardizing the construction of part 102.

Figure 4:
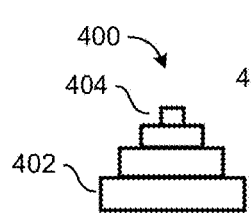
FIG. 4 is a side view of a test structure, according to an aspect of the present disclosure.

Referring now to FIG. 4, a side view of a test structure 400, according to an aspect of the present disclosure, is shown.

Test structures 400 may be produced by device 100 at each sector 202. Test structure 400 is chosen to evaluate the performance of light source 114 at sector 202. In an aspect, test structure 400 comprises a low resolution portion 402 (labeled, for clarity, only as low resolution portion 402 in FIG. 4) and a high resolution portion 404 (labeled, for clarity, only as high resolution portion 404 in FIG. 4). Low resolution portion 402 is configured to be formed even if light source 114 is under performing at sector 202. High resolution portion 404 is configured to successfully print only where light source outputs sufficient light at sector 202.

In an aspect, test structure 400 is a cone shape. In another aspect, as shown in FIG. 4, test structure 400 is a multi-tiered pyramid. In yet another aspect, test structure 400 is a rod or column. As will be apparent to those having skill in the relevant art(s) after reading the description herein, test structure 400 may be configured in other shapes suitable for evaluating the performance of light source 114 at sector 202, across sectors 202 and over build area 112 as a whole. Test structures 400 may be interconnected by secondary structures (not shown) such as beams, configured to successfully print only where light source 114 is producing a specified light output in the cross section of the beam.

Figure 5:
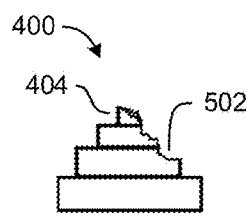
FIG. 5 is a side view of a test structure wherein the test structure has not formed properly, according to an aspect of the present disclosure.

Referring now to FIG. 5, a side view of test structure 400 comprising a print failure region, according to an aspect of the present disclosure, is shown.

Print failures 502 may appear where sector 202 corresponding with test structure 400 lacks sufficient light output to successfully produce all portions of test structure 400. In an aspect, sector 202 is a dim spot and therefore produces insufficient light output to form high resolution portion 404, leading to print failure 502. A user may inspect test structure 400 for print failures 502. If print failure 502 is present, the user may note its location and provide that information to software which controls the functionality of light source 114. For example, if print failure 502 is present in low resolution portion 402 for a given exposure time, print failure 502 indicates a maximum light output. If print failure is present in high resolution portion 404 for a given exposure time, print failure 502 indicates a different, higher maximum light output. Providing this information to software which controls the functionality of light source 114 enables light source 114 to ensure successful printing of layers by increasing light brightness for a dim sector 202, increasing exposure time for a dim sector 202, building high resolution parts on top of a brighter sector 202, and other adjustments and usages apparent to those skilled in the relevant art(s) after reading the description herein.

Figure 6:
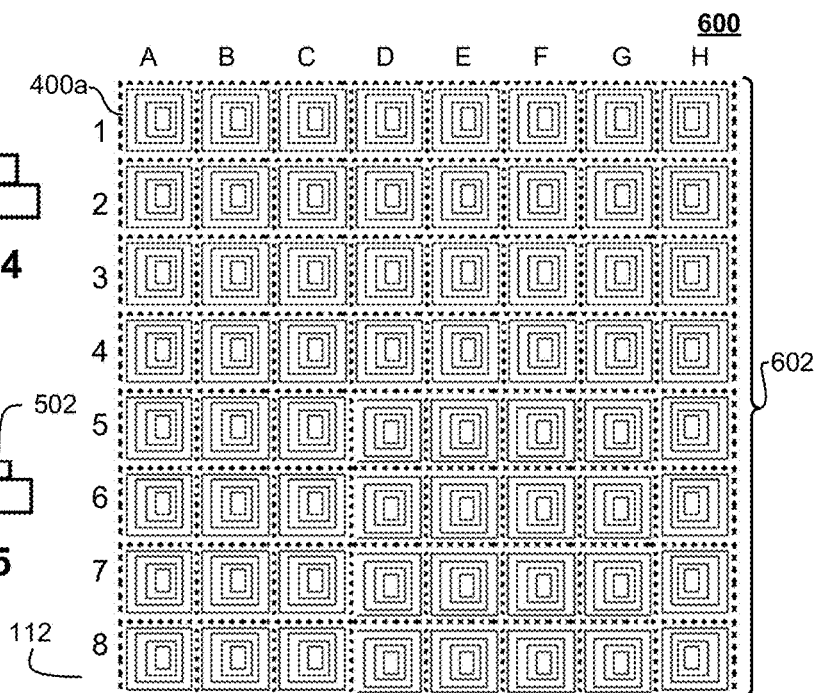
FIG. 6 is a top view of a calibration object comprising a grid of four-tiered test structures, according to an aspect of the present disclosure.

Referring now to FIG. 6, a top view 600 of a calibration object 602 comprising a grid of four-tiered test structures 400, according to an aspect of the present disclosure, is shown. A grid is shown in dashed lines for reference, indicating build area 112.

Calibration object 602 comprises a plurality of test structures 400 (labeled, for clarity, only as test structure 400a in FIG. 6). In an aspect, test structures 400 are centered over each sector 202. The user may print calibration object 602 and then inspect each test structure 400. The results of the inspections may be provided to software which controls light source 114 or some other portion of device 100 such that the actual output of light source 114 may be saved and utilized in building parts 102. The user may input the inspection results for each test structure 400 (e.g., test structure inspection results for test structure in the A1 sector, test structure inspection results for test structure in the A2 sector, and so on). In another aspect, the user may input information related to only those test structures 400 which have print failures 502 (e.g., details of the print failure for test structure in the F3 sector).

Figure 7:
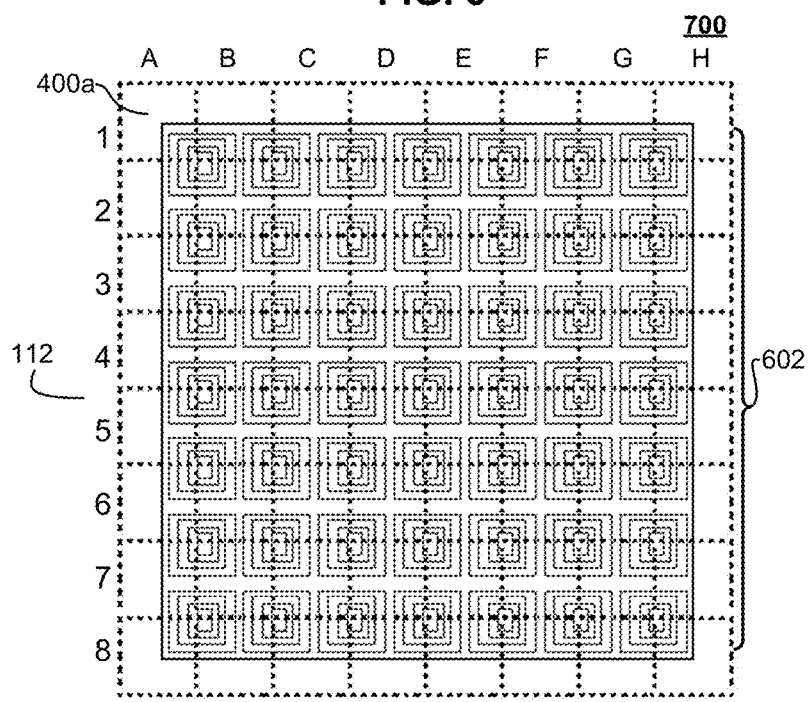
FIG. 7 is a top view of a calibration object comprising an offset grid of four-tiered test structures, according to an aspect of the present disclosure.

Referring now to FIG. 7, a top view 700 of calibration object 602 comprising an offset grid of four-tiered test structures 400, according to an aspect of the present disclosure, is shown. A grid is shown in dashed lines for reference, indicating build area 112.

Calibration object 602 may be smaller than the entire build area 112. Calibration object 602 covers only a portion of build area 112. Calibration object 602 may be offset from the build area grid, as shown, in order to provide additional detail on light output. For example, high resolution portions 404 of each test structure 400 of calibration object 602 are placed at the intersection of four adjacent sectors 202 (e.g., sectors A1, A2, B1, and B2). Printing off-set calibration object 602 and sector-centered calibration object 602 in succession and inputting the results provides additional data on light output performance of light source 114.

Figure 8:
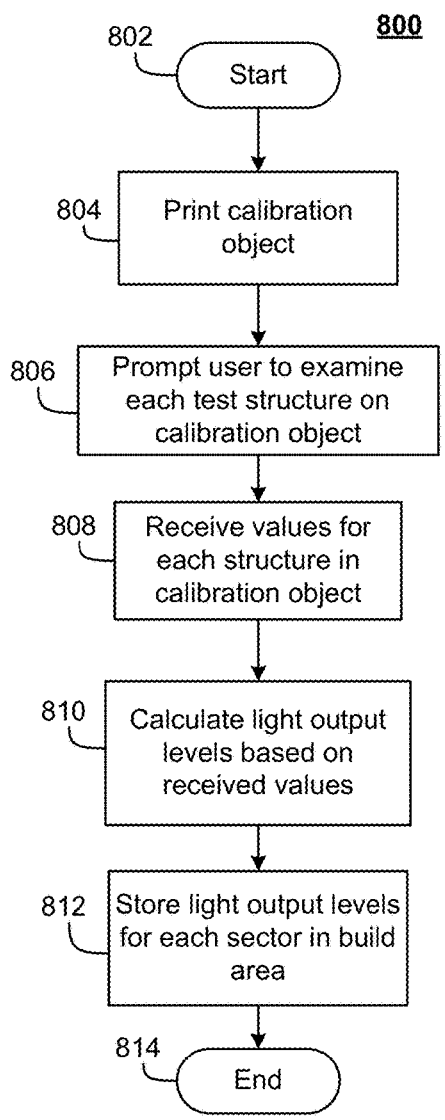
FIG. 8 is a flowchart illustrating an exemplary process for facilitating determining and calibrating light output levels in an additive manufacturing device, according to an aspect of the present disclosure.

Referring now to FIG. 8, a flowchart illustrating an exemplary process 800 for facilitating determining and calibrating light output levels in additive manufacturing device 100, according to an aspect of the present disclosure, is shown.

In an aspect, a calibration object, such as calibration object 602, is produced utilizing additive manufacturing device 100. In an aspect, test structure 400 is a multi-layer pyramid comprising square layers. The top layer is high resolution portion having sides of 100 microns, thereby evaluating high resolution performance. Test structures 400 are arranged in a grid such that the formation of each of test structures 400 corresponds with sector 202 of build area 112. The design of test structures 400 (e.g., the wall thickness, dimensions, shape, number of tiers, and the like) is chosen such that construction of test structure 400 at specified printing parameters (e.g., exposing each layer for ten seconds at 90% brightness) will fail if the light output to sector 202 deviates from a desired range. For example, if high resolution portion 404 fails, that indicates that there is sufficient light output to produce low resolution portion 402, and low resolution layers, in that sector 202, but insufficient light output in that sector 202 to produce higher resolution layers at the specified printing parameters. Such information can be used to determine the light output of the light source 114 at each sector 202 of build area 112. Production of a calibration object may be repeated using other sets of printing parameters (e.g., exposing each layer for eight seconds at 100% brightness, exposing each layer for twelve seconds at 90% brightness, exposing each layer for ten seconds with brightness varying per sector) in order to confirm the measured light outputs, evaluate other light output ranges, and other reasons apparent to those skilled in the relevant art(s) after reading the description herein.

After additive manufacturing device 100 produces the calibration object, a user may inspect the calibration object. If the build failed to produce all or part of given test structure 400, the information may be provided to an additive manufacturing device control software. Information may be provided by indicating a grid row and column (as shown in FIGS. 2-3 and 6-7) location of the failed test structure 400. Information may also include the nature of print failure 502. For example, where test structure 400 is a tiered pyramid and the uppermost tier failed to be constructed, a user may specify that the upper tier failed (high resolution portion 404). This information is received by the software and, given other controls (e.g., type of photopolymer used, commanded brightness level, exposure time), indicates the actual light output at the corresponding sector. Similarly, successful production of test structures 400 corresponding with other sectors 202 indicates the actual light output of such sectors 202.

Process 800, at least a portion of which may execute within computing functionality 1000, utilizes device 100 to determine and calibrate light output levels in additive manufacturing device 100 by a user, begins at step 802 with control passing immediately to step 804.

At step 804, device 100 produces calibration object 602. In an aspect, calibration object 602 is produced using a set of default control parameters or "factory settings." Such default settings may indicate a layer exposure time, a commanded brightness level for light 118 produced by light source 114, and other factors apparent to those having skill in the relevant art(s) after reading the description herein. In another aspect, the user may provide device control parameters of his or her own choosing. In yet another aspect, the control software may utilize control parameters based on a previous calibration. Each layer having a layer exposure time, the layer exposure time equal to the greatest of the exposure times determined for each of the portions of the three-dimensional object created within the layer. The layer exposure time may vary from layer to layer.

At step 806, the user is prompted to inspect calibration object 602 after it has been produced by device 100. The user may be prompted by computing functionality 1000, device 100, or some other object. The user then inspects each test structure 400 for print failures 502, noting where such print failures 502 occur. The user may note the location of a test structure 400 containing print failure 502 (e.g., row 3, column B), the portion of the test structure 400 where print failure 502 is located (e.g., low resolution portion 402), and the like. The plurality of test structure integrity indications may be received via an additive manufacturing device user interface. The plurality of test structure integrity indications may be generated via machine-assisted inspection.

The method may further comprise: generating, via the additive manufacturing device 100, a second calibration object from the solidifiable material, the second calibration object comprising a second plurality of test structures, each of the second plurality of test structures offset from and corresponding to the plurality of build area sectors; receiving a second plurality of test structure integrity indications related to the second plurality of test structures; and creating, via the additive manufacturing device controller 140, a second plurality of temporal compensation values, each of the second plurality of temporal compensation values corresponding to the offset location of each of the second plurality of test structures and chosen to, at a constant brightness, solidify at least a portion of the corresponding test structure.

The method may further comprise: modifying, via the additive manufacturing device controller 140, the plurality of temporal compensation values stored wherein the modification is based on the created second plurality of temporal compensation values.

The created plurality of temporal compensation values are stored within the additive manufacturing device controller 140. The method further comprising storing, within the additive manufacturing device controller 140, the second plurality of temporal compensation values.

At step 808, the user provides information about the success or failure of the calibration object 602 production. The user may provide the location and type of print failures 502 to software controlling device 100.

At step 810, the device control software converts the information received into light output levels. The received information may also be stored for future use (e.g., comparison to future calibration object 602 prints). In an aspect, the device control software utilizes the received information and the control parameters used to produce calibration object 602 to calculate light output levels at each sector 202 in build area 112. The control software may further determine light output levels for each pixel or other controllable element of light source 114 via interpolation of data from each sector 202, applying a Gaussian distribution to the overall build area 112, applying a Gaussian distribution to each sector 202, deriving a light output variation slope and utilizing that slope to calculate light output levels for each controllable element, or via another process apparent to those skilled in the relevant art(s) after reading the description herein.

At step 812, light output levels calculated in step 810 are stored for future use in producing parts 102.

Process 800 then terminates at step 814.

Information about calibration object 602 construction success indicates actual light output values of light source 114. Such information may be used to adjust the intensity of each controllable element (e.g., pixel) of the light source to the measured minimum, thereby creating a uniformly intense light source.

Such information may also be used to deliver a uniform amount of light energy over time to each portion of a layer being formed. That is, because the actual light output of sectors 202 in the build area 112 is known or estimated based on process 800, such sectors 202 may be exposed for a time and the amount of light energy incident upon the exposed photopolymer in that area may be calculated. Because a known amount of light energy is required to cure the photopolymer, that amount of energy may be sent to the exposed photopolymer in that sector 202 by dividing the required amount of energy by the measured light output corresponding to that sector 202, yielding an exposure time. By exposing sector 202 or area corresponding with a controllable element for the exposure time, the required amount of energy is sent to the photopolymer, ensuring a consistent cure.

Figure 9:
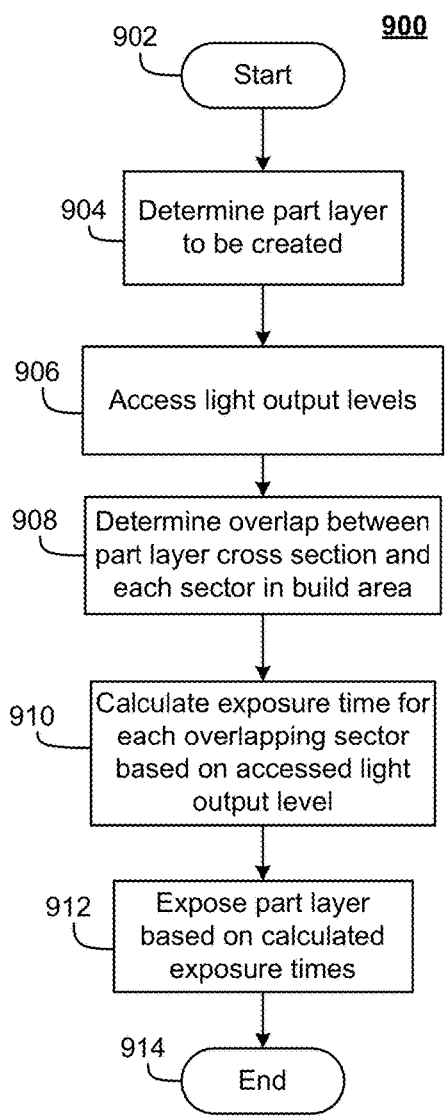
FIG. 9 is a flowchart illustrating an exemplary process for facilitating the creation of a part utilizing stored light output levels, according to an aspect of the present disclosure.

Referring now to FIG. 9, a flowchart illustrating an exemplary process 900 for facilitating the creation of part 102 utilizing stored light output levels, according to an aspect of the present disclosure, is shown.

Upon determining the actual light output of sectors 202 or areas corresponding with controllable elements of light source 114, a variety of operations may be carried out which optimize part 102 production. For example, a flux compensation factor may be generated for each sector 202 or area corresponding with a controllable element of light source 114 which, when applied, causes light source 114 to produce a uniform light output flux. A temporal compensation factor may also be generated for each sector 202 or area corresponding with a controllable element of light source 114 which, when applied, causes light source 114 to generate a uniform amount of energy at each portion of build area 112 for a given amount of time. The build exposure time for each layer 106 being created may be dynamically minimized based on overlap between build area 112 sections and the part layer cross section. That is, if layer 106 cross section only overlaps areas that produce high light output, layer 106 may be exposed at a high brightness for a shorter amount of time compared to layer 106 that overlaps both high light output and low light output areas. Furthermore, a part 102 having a small cross section may be placed over known areas of high light output, enabling shorter exposure times and a faster overall built time.

Process 900, at least a portion of which may execute within computing functionality 1000, utilizes device 100 and facilitates the creation of part 102 utilizing stored light output levels, begins at step 902 with control passing immediately to step 904.

At step 904, the layer 106 cross section to be polymerized or otherwise produced next is determined. Determination may be performed by accessing a part 102 job file and accessing the next layer file called for.

At step 906, stored light output levels are accessed. In an aspect, stored light output levels for each sector 202 or area corresponding with a controllable element of light source 114 are accessed.

In another aspect, only the light output levels for the sectors 202 or areas corresponding with controllable elements of light source 114 which will be used to produce layer 106 are accessed. In such an aspect, steps 906 and 908, below, may be reversed.

At step 908, overlap between layer 106 cross section and build area 112 is determined in order to identify controllable elements of light source 114 which must be used to produce layer 106.

At step 910, an exposure time for each controllable element to be utilized in the production of layer 106 is calculated. The exposure time is calculated using the required energy to produce layer 106 and the stored light output levels accessed in step 906.

At step 912, layer 106 is formed by exposing photopolymer to light 118 from light source 114 for the exposure times calculated in step 910. Some portions of layer 106 may be exposed longer than other portions based on the stored light output levels.

Process 900 then terminates at step 914.

Figure 10:
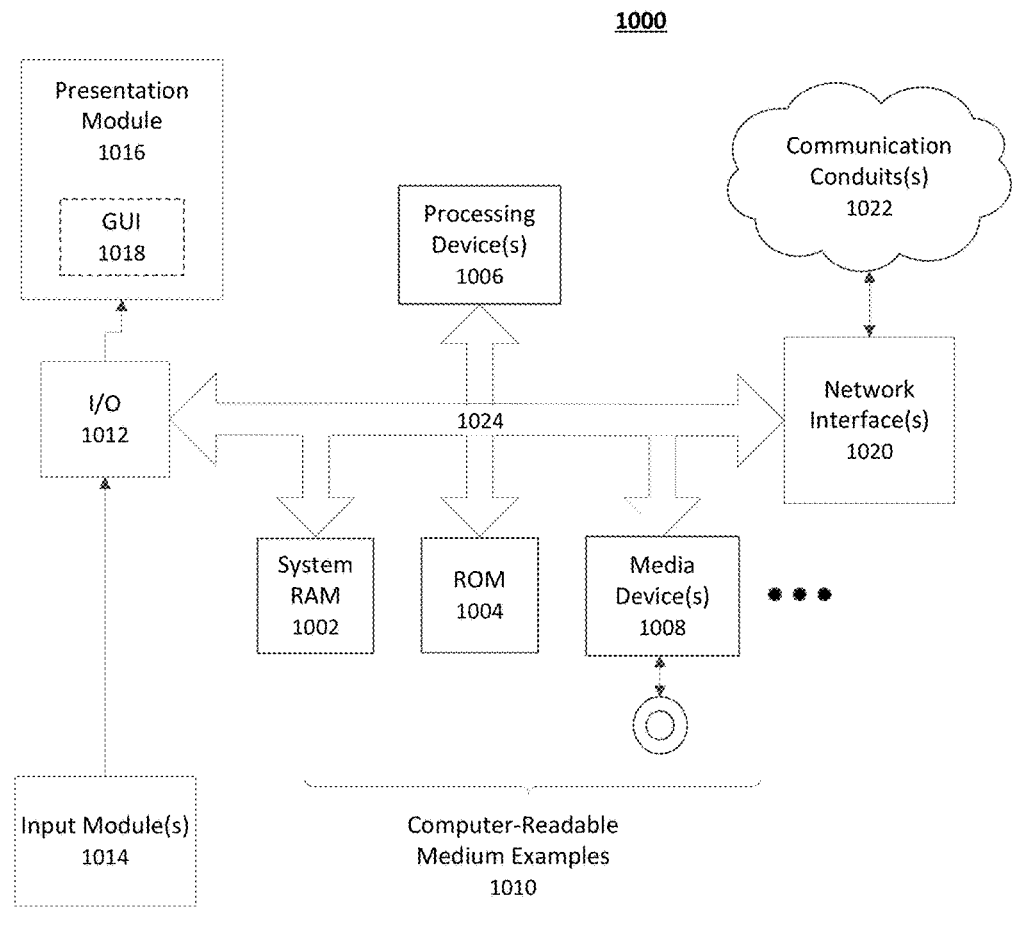
FIG. 10 is a block diagram of an exemplary computing system useful for implementing aspects of the present disclosure.
Figure 10:
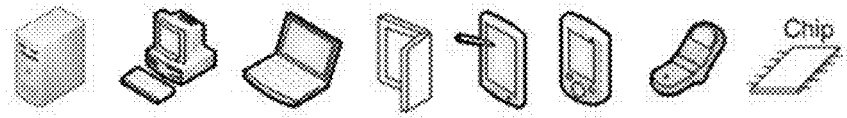

Referring now to FIG. 10, a block diagram of an exemplary computer system useful for implementing various aspects the processes disclosed herein, in accordance with one or more aspects of the present disclosure, is shown.

That is, FIG. 10 sets forth illustrative computing functionality 1000 that may be used to device control software, device 100, or any other component utilized herein. In all cases, computing functionality 1000 represents one or more physical and tangible processing mechanisms.

Computing functionality 1000 may comprise volatile and non-volatile memory, such as RAM 1002 and ROM 1004, as well as one or more processing devices 1006 (e.g., one or more central processing units (CPUs), one or more graphical processing units (GPUs), and the like). Computing functionality 1000 also optionally comprises various media devices 1008, such as a hard disk module, an optical disk module, and so forth. Computing functionality 1000 may perform various operations identified above when the processing device(s) 1006 execute(s) instructions that are maintained by memory (e.g., RAM 1002, ROM 1004, and the like).

Instructions and other information may be stored on any computer readable medium 1010, including, but not limited to, static memory storage devices, magnetic storage devices, and optical storage devices. The term "computer readable medium" also encompasses plural storage devices. In all cases, computer readable medium 1010 represents some form of physical and tangible entity. By way of example, and not limitation, computer readable medium 1010 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1002, ROM 1004, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 1000 may also comprise an input/output module 1012 for receiving various inputs (via input modules 1014), and for providing various outputs (via one or more output modules). One particular output module mechanism may be a presentation module 1016 and an associated GUI 1018. Computing functionality 1000 may also include one or more network interfaces 1020 for exchanging data with other devices via one or more communication conduits 1022. In some embodiments, one or more communication buses 1024 communicatively couple the above-described components together.

Communication conduit(s) 1022 may be implemented in any manner (e.g., by a local area network, a wide area network (e.g., the Internet), and the like, or any combination thereof). Communication conduit(s) 1022 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices and environments other than those mentioned herein, implementation utilizing other additive manufacturing devices). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A method for generating a three-dimensional (3D) object using an additive manufacturing device, the additive manufacturing device comprising a light source having controllable light source elements, a build area comprising a plurality of build area sectors adjacent to a solidifiable material, each build area section having a controllable light source element associated therewith, and an additive manufacturing device (ADM) controller having a plurality of temporal compensation values corresponding to the plurality of build area sectors stored therein, the method comprising the steps of:

(a) determining a layer cross section of a 3D object layer of the 3D object to be created, the 3D object having a plurality of 3D object layers;

(b) identifying those build area sectors of the plurality of build area sectors the determined layer cross section will overlap wherein the plurality of build area sectors produces varying light outputs;

(c) retrieving a corresponding temporal compensation value for each corresponding identified build area sector of the identified build area sectors wherein the temporal compensation value to cause the light source to generate an amount of brightness level for the layer cross section for a calculated amount of exposure time at the corresponding build area section, the calculated amount of exposure time to compensate for a difference in a produced light output associated with the corresponding build area section relative to the produced light outputs of other identified build sectors;
(d) operating the light source to direct the amount of the brightness level to the solidifiable material, of the layer cross section overlapping the identified build area sectors, from the controllable light source elements associated with the identified build area sections wherein each individual controllable light source element being controlled to produce the amount of the brightness level at the build area sector for a duration according to the calculated amount of the exposure time associated with the retrieved temporal compensation value for that identified build area sector to cause curing of the solidifiable material to construct the 3D object layer; and
(e) repeating steps (a)-(d) for each 3D object layer of the plurality of 3D object layers to create the 3D object.

2. The method of claim 1, wherein the light source is a pixel-based projector light source.

3. The method of claim 1, further comprising a basin containing the solidifiable material, the basin comprising a base, wherein the build area is a top base surface.

4. The method of claim 1, further comprising the method step of:
calibrating the additive manufacturing device, the calibrating of the additive manufacturing device comprising the method steps of:
generating, via the additive manufacturing device, a calibration object from the solidifiable material, the calibration object comprising a plurality of test structures, a respective one test structure of the plurality of test structures being associated with a different one build area sector of the plurality of build area sectors wherein the generating of the calibration object includes:
exposing a layer of the calibration object for a first exposure time at a first brightness level wherein the first brightness level is a 100% brightness level of the light source,
exposing the layer of the calibration object for a second exposure time at a second brightness level of the light source lower than the first brightness level, and
exposing the layer of the calibration object for a duration of a third exposure time at each build area sector to varying brightness levels from the individual controllable light source elements to create a map of light outputs from the build area sectors wherein the corresponding temporal compensation value for the corresponding identified build area sector is a calibrated temporal compensation value based on the map of the light outputs and
the calibrated temporal compensation values corresponding to the plurality of build area sectors being chosen to, at a constant brightness level, solidify at least a portion of the corresponding test structure; and
storing the calibrated temporal compensation values for use in creation of the 3D object.

5. The method of claim 4, wherein the calibrating of the additive manufacturing device comprises the method steps of:
receiving, via the AMD controller, part creation instructions, the part creation instructions indicating the 3D object to be created from the solidifiable material; and
calculating, via the AMD controller, for each portion of the 3D object, the amount of the exposure time based on a corresponding calibrated temporal compensation value and the part creation instructions.

6. The method of claim 4, wherein the plurality of tests structures are arranged in a grid such that a formation of each individual test structure corresponds with a different one build area sector and further comprising the method step of receiving, by the AMD controller, the plurality of test structure integrity indications wherein the method step of receiving the plurality of test structure integrity indications includes:
prompting, via an AMD user interface, a user to inspect each of the plurality of test structures.

7. The method of claim 4, wherein the plurality of tests structures are arranged in a grid such that a formation of each individual test structure corresponds with a different one build area sector and further comprising the method step of receiving, by the AMD controller, the plurality of test structure integrity indications being generated via machine-assisted inspection.

8. The method of claim 4, wherein the calibrated temporal compensation values are stored within the AMD controller.

9. The method of claim 4, wherein the calibrating of the additive manufacturing device comprises the method steps of:
generating, via the additive manufacturing device, a second calibration object from the solidifiable material, the second calibration object comprising a second plurality of test structures, each of the second plurality of test structures offset from and corresponding to the plurality of build area sectors;
receiving a second plurality of test structure integrity indications related to the second plurality of test structures; and
creating, via the AMD controller, a second plurality of temporal compensation values, each of the second plurality of temporal compensation values corresponding to an offset location of each of the second plurality of test structures and chosen to, at a constant brightness level, solidify at least a portion of a respective one test structure of the second plurality of test structures.

10. The method of claim 9, further comprising:
modifying, via the AMD controller, the stored calibrated temporal compensation values based on the created second plurality of temporal compensation values.

11. The method of claim 1, further comprising the method steps of:
determining an actual light output of each of the build area sectors; and
generating a temporal compensation factor for each of the build area sectors which, when applied, causes the light source to generate a uniform amount of brightness level at each of the build area sectors for the calculated amount of exposure time.

12. The method of claim 1, further comprising the method steps of:
determining an overlap between adjacent build area sectors and the layer cross section of the layer cross section; and
dynamically minimizing the amount of the exposure time for each 3D object layer of the 3D object being created based on the overlap between the identified build area sections and the layer cross section and the produced light output of each of the identified build area sections.

13. The method of claim 1, further comprising:
determining the temporal compensation value for each build area sector, the determining of the temporal compensation value includes generating of a calibration object by:
exposing a layer of the calibration object for a first exposure time at a first brightness level of the light source wherein the first brightness level is a 100% brightness level of the light source,
exposing the layer of the calibration object for a second exposure time at a second brightness level of the light source lower than the first brightness level, and
exposing the layer of the calibration object for a duration of a third exposure time at each build area sector to varying brightness levels from the individual controllable light source elements to create a map of light outputs from the build area sectors wherein the corresponding temporal compensation value for the corresponding identified build area sector is a calibrated temporal compensation value based on the map of the light outputs and the calibrated temporal compensation values corresponding to the plurality of build area sectors being chosen to, at a constant brightness level, solidify at least a portion of the corresponding test structure.

14. The method of claim 13, wherein the calibration object comprises a plurality of test structure, each test structure comprising a multi-tiered pyramid centered over a corresponding build area sector.

15. The method of claim 1, wherein each of the controllable light source elements corresponds to a pixel.

16. The method of claim 1, further comprising the method step of:
determining a flux compensation factor for each build area sector, the flux compensation factor, when applied to the individual controllable light source elements, causes the light source to produce a uniform light output flux.

17. The method of claim 1, wherein the varying light outputs include a first light output and a second light output, the first light output is higher than the second light output and further comprising the method steps of:
(f) determining whether each build area sector of the plurality of build area sectors is one of a first light output area sector producing the first light output and a second light output area sector producing the second light output; and
(g) determining whether the 3D object layer overlaps one of (i) only first light output area sectors and (ii) both the at least one first light output area sector and at least one second output light area sector,
wherein, at step (d), operating the light source to direct a highest brightness level to the solidifiable material for a first amount of time, if the 3D object layer is determined, at step (g), to overlap only the first light output area sectors and for a second amount of time, if the 3D object is determined, at step (g), to overlap both the at least one first light output area sector and the at least one second light output area sector, wherein the first amount of time is shorter than the second amount of time.

18. A method for generating a three-dimensional (3D) object using an additive manufacturing device, the additive manufacturing device comprising light source having controllable light source element, a build area comprising a plurality of build area sectors adjacent to a solidifiable material, and an additive manufacturing device controller having a plurality of temporal compensation values corresponding to the plurality of build sectors stored therein, the method comprising the steps of:
(a) determining whether each build area sector of the plurality of build area sectors is one of a first light output area sector producing the first light output and a second light output area sector producing the second light output;
(b) determining a layer cross section of a 3D object layer of the 3D object to be created, the 3D object having a plurality of 3D object layers;
(c) identifying each of the plurality of build area sectors overlapped by the determined layer cross section;
(d) determining whether the 3D object layer overlaps one of (i) only first light output area sectors and (ii) both the at least one first light output area sector and at least one second output light area sector;
(e) retrieving, for each of the identified build area sectors, the corresponding temporal compensation value;
(f) determining, for each portion of the three-dimensional object layer, an exposure time based on the retrieved temporal compensation values;
(g) operating the light source according to the determined exposure times to direct electromagnetic radiation toward a solidifiable material according to the retrieved temporal compensation values to cause curing of the solidifiable material to construct the 3D object layer; and
(h) repeating steps (b)-(g) for each 3D object layer of the plurality of 3D object layers to create the 3D object,
wherein, at step (g), operating the light source to direct a highest brightness level to the solidifiable material for a first amount of time, if the 3D object layer is determined, at step (g), to overlap only the first light output area sectors and for a second amount of time, if the 3D object is determined, at step (g), to overlap both the at least one first light output area sector and the at least one second light output area sector, wherein the first amount of time is shorter than the second amount of time.

* * * * *